Feb. 7, 1933. J. E. ERICKSON 1,896,396
STEERING DEVICE
Filed June 20, 1932 2 Sheets-Sheet 1
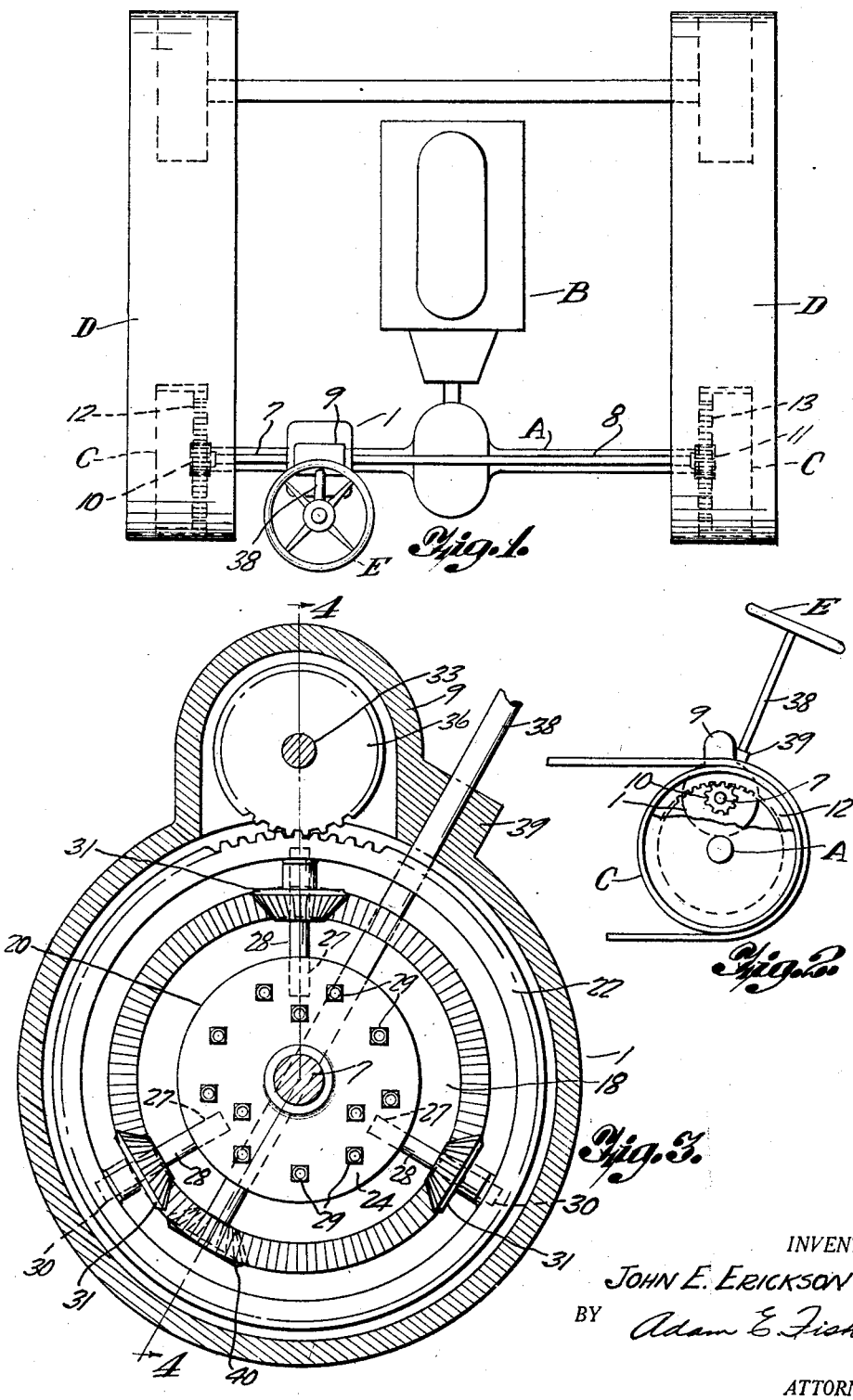
INVENTOR.
JOHN E. ERICKSON
BY Adam E. Fisher
ATTORNEY.

Patented Feb. 7, 1933

1,896,396

UNITED STATES PATENT OFFICE

JOHN E. ERICKSON, OF EAST GRAND FORKS, MINNESOTA

STEERING DEVICE

Application filed June 20, 1932. Serial No. 618,110.

My invention relates to a steering device for steering snowmobiles, crawler or "Caterpillar" tractors, tanks and similar vehicles.

The main object of the invention is to provide a steering device operating as a double differential gear train and connected to the driving wheels or tracks of the vehicle in such manner that the speed of travel of one wheel or track may be retarded while the other is advanced to effect the steering and guiding movement. The use of this device thus makes it unnecessary to use steering runners or front wheels on snowmobiles.

Another object is to provide a steering device of this kind which in installation requires no alternation in the usual differential and transmission mechanism and does not in any way interfere with the normal operation thereof.

A further object is to provide a steering device of this kind in a simple, readily operated, efficient and positive form.

The foregoing and other objects together with means whereby the same may be carried into effect will best be understood from the following description of a preferred embodiment of the invention taken in connection with the accompanying drawings wherein:

Figure 1 is plan view of the chassis of a tractor equipped with my invention.

Figure 2 is an enlarged fragmental detail view showing the gears connecting the steering device and drive wheels.

Figure 3 is a further enlarged cross section through the steering device showing one set of differential gears therein.

Figure 4:
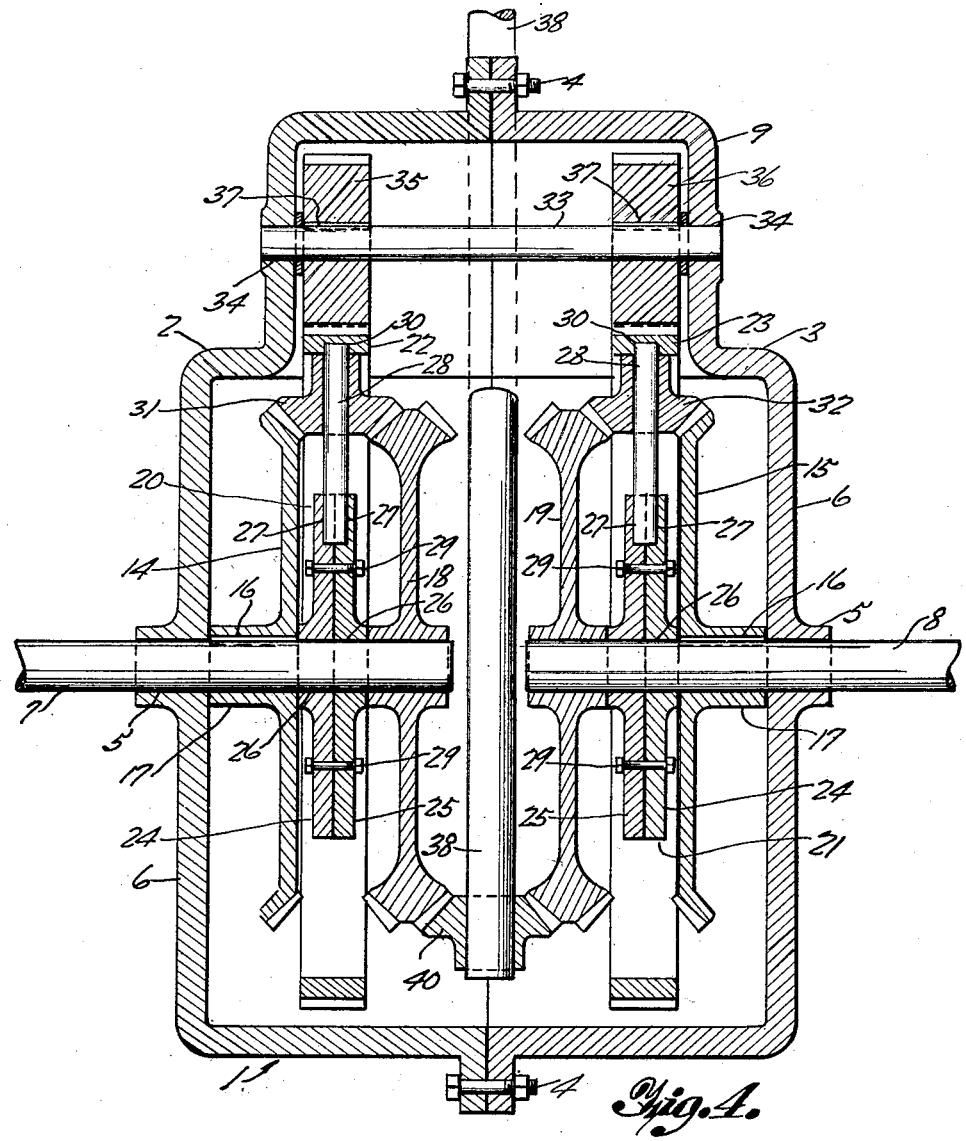
Figure 4 is an enlarged section along the line 4—4 of Figure 3.

Referring now more particularly to the drawings, my invention comprises a housing 1 preferably, though not necessarily formed of two complementary halves or sections 2 and 3 flanged and secured together by bolts 4 and having aligned bearing apertures 5 in their ends 6 through which are journaled shafts 7 and 8 which extend inward into the housing but fall considerably short of meeting at their inner ends as shown. In cross section the housing 1 is substantially circular or cylindrical but has a reduced and offset portion 9 on its intended upper side for a purpose to be described. The housing is secured on or adjacent the rear axle A of the tractor B in such manner that the shafts 7 and 8 may be extended out into or adjacent the drive wheels C driving the "Caterpillar" or crawler tracks D thereof as shown in Figure 1 and pinions 10 and 11 are secured on these outer ends of the shafts 7 and 8 and are placed in mesh with internal gears 12 and 13 secured to and rotating with the said drive wheels C as shown in Figures 1 and 2 in the drawings.

Outer bevel gears 14 and 15 are keyed at 16 to the shafts 7 and 8 and are disposed within the housing 1 with their hubs 17 in contact or substantially so, with the ends 6 of said housing, the teeth of said gears being turned or facing inwardly. Inner bevel gears 18 and 19 are journaled freely on the extreme inner ends of the shafts 7 and 8 at some distance from the outer bevel gears 14 and 15 and these gears 18 and 19 have sets of teeth on both their inner and outer sides or faces as shown. Interposed between the inner and outer bevel gears on each shaft 7 and 8 are hubs designated generally at 20 and 21 and supporting or carrying large externally toothed ring spur gears 22 and 23, the diameter of which is considerably greater than said beveled gears. Each hub 20 and 21 comprises two complementary circular plates 24 and 25 with control apertures 26 by means of which they are journaled freely on the shafts 7 and 8 and having radially extended complementary semicircular sockets 27 cut in their meeting faces and opening out at their outer peripheries. These sockets 27 are adapted to register and form circular sockets to receive the spokes 28 when the two plates 24 and 25 are placed together side by side as shown and the assembly is secured together by a plurality of bolts 29 passed through the two plates of each hub 20 and 21. The outer ends of the spokes 28 are placed in sockets 30 provided in the inner periphery of the ring gears 22 and 23. The spokes 28 are shown in the drawings as being three in number for each ring gear 22 and 23 and being equally spaced circumferentially but it is understood that any other number may be employed as desired.

This construction of the hubs 20 and 21, ring gears 22 and 23 and spokes 28 provides a means for supporting three bevel differential pinions 31 and 32 on each assembly as shown, the spokes 28 acting as axles or shafts to rotatably support these pinions as will be understood. The differential pinions 31 and 32 are placed in mesh with the teeth of the outer bevel gears 14 and 15 and with the outer series of teeth on the inner bevel gears 18 and 19. A counter shaft 33 is journaled at its ends at 34 in the ends of the offset portion 9 of the housing 1 and transmission or connecting pinions 35 and 36 having spur teeth are keyed at 37 on this shaft and placed in mesh with the ring gears 22 and 23, this offset portion 9 being adapted to receive and enclose these pinions as shown. The steering shaft 38 to the upper end of which the usual steering wheel E is affixed is extended down through a boss 39 on the housing 1 and a bevel steering pinion 40 is secured to the lower end of this shaft and placed in mesh with the inner series of teeth on the inner bevel gears 18 and 19 at the under sides thereof. The steering shaft 38 is set at an angle to the vertical and so may pass to one side of the countershaft 33 and clear the same, the steering shaft preferably inclining backward when placed on the tractor as shown in Figures 1 and 2.

In operation the outer bevel gears 14 and 15 are driven continuously through the shafts 7 and 8, pinions 10 and 11 and internal gears 12 and 13 as the drive wheels C rotate and as the tractor or other vehicle moves forward or backward. The inner bevel gears 18 and 19 are held stationary while the steering wheel E is stationary and so the differential pinions 31 and 32 travel around these inner bevel gears and rotate the ring gears 22 and 23. Now to turn to the right the driver turns the steering wheel E in the usual direction and the inner bevel gears 18 and 19 are rotated in opposite directions by the steering pinion 40 and this movement is transmitted to the drive wheels C through the differential pinions 31 and 32, outer bevel gears 14 and 15, shafts 7 and 8, and thence to the pinions 10 and 11 and internal gears 12 and 13. The effect is to retard the speed of the right outer bevel gears and hence the right drive wheel C and increase the speed of the left outer bevel gear and the left drive wheel C and so cause the tractor to turn to the right as desired. The reverse is true as the steering wheel E is turned to the left, the speed of the drive wheel on the left being retarded while the speed of the drive wheel on the right is increased causing the tractor to turn to the left. The countershaft 33 and gears 35 and 36 act simply to connect the ring gears 22 and 23 and prevent independent rotation of the latter so that the differential rotation and effect of the pinions 31 and 32 will influence the speed of rotation of the outer gears 14 and 15 and so steer the tractor as described. Without some means to connect the ring gears or rings carrying the pinions 31 and 32 the effect of rotating the steering shaft 38 would be simply to cause said pinions to travel faster or slower around the outer gears 14 and 15 without varying the speed thereof.

Further details of the construction and operation of the invention will be understood without further description at this point and it will be evident that I have provided an efficient and positive device for its purpose and one which will operate over a long period of time without any attention or replacement.

While I have herein set forth a certain preferred embodiment of my invention it is understood that I may vary from the same in minor structural details so as best to construct a practical device for the purposes intended, not departing from the spirit of the invention, and within the scope of the appended claims.

I claim:

1. In a steering device for vehicles, a pair of shafts connected to the driving wheels of the vehicle, outer bevel gears secured to the shafts, inner bevel gears journaled on the shafts adjacent the outer gears, ring gears journaled on the shafts between the inner and outer bevel gears, differential pinions journaled on the ring gears and placed in mesh with the inner and outer bevel gears, a countershaft, pinions secured to the countershaft and placed in mesh with the ring gears, a steering shaft, and a steering pinion secured to the steering shaft and meshing with the inner bevel gears.

2. In a steering device for "Caterpillar" vehicles, a pair of axially aligned shafts, gears secured to the drive wheels of the vehicle, pinions secured to the outer ends of the shafts and meshing with the said gears, outer bevel gears secured to the shafts adjacent their inner ends, inner beveled gears journaled freely on the shafts inwardly of the outer bevel gears, the said inner bevel gears having teeth on both their inner and outer faces, ring gears journaled freely on the shafts between the inner and outer bevel gears, differential pinions journaled on the ring gears and meshing with the outer bevel gears and the teeth on the outer faces of the inner bevel gears, a countershaft, pinions secured to the countershaft and meshing with the said ring gears, a steering shaft, a steering bevel pinion secured to the steering shaft and meshing with the teeth on the inner face of each inner bevel gear.

In testimony whereof, I affix my signature.

JOHN E. ERICKSON.